J. W. HIETT.
RAT TRAP.
APPLICATION FILED FEB. 11, 1921.

1,407,861.

Patented Feb. 28, 1922.
2 SHEETS—SHEET 1.

Inventor,
J. W. Hiett
By C. A. Snow & Co.
Attorneys.

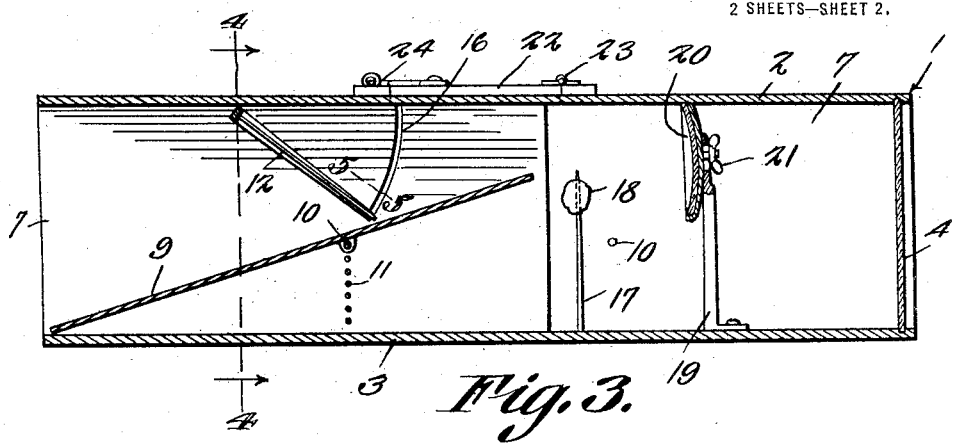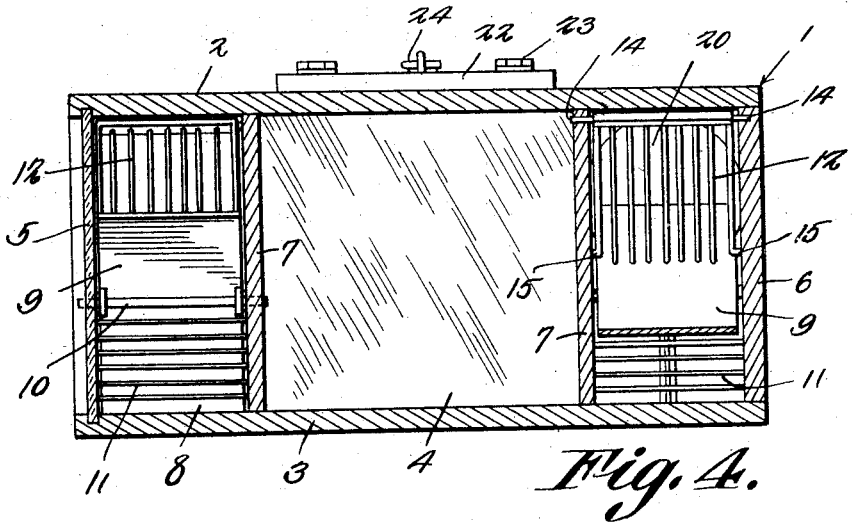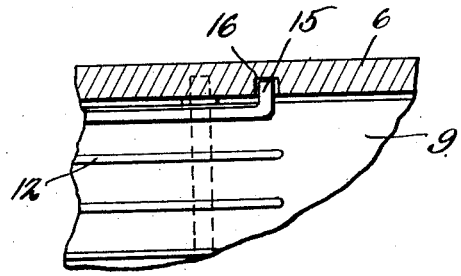

UNITED STATES PATENT OFFICE.

JOSEPH W. HIETT, OF CONWAY, ARKANSAS.

RAT TRAP.

1,407,861. Specification of Letters Patent. Patented Feb. 28, 1922.

Application filed February 11, 1921. Serial No. 444,189.

*To all whom it may concern:*

Be it known that I, JOSEPH W. HIETT, a citizen of the United States, residing at Conway, in the county of Faulkner and State of Arkansas, have invented a new and useful Rat Trap, of which the following is a specification.

The device forming the subject matter of this application is a trap, and one object of the invention is to provide a trap in which several animals may be housed, it being unnecessary to clean out the trap each time that an animal is caught.

Another object of the invention is to provide novel means for preventing animals from retreating from the trap.

Another object of the invention is to provide novel means for presenting the bait in a tempting way to the animal.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1:
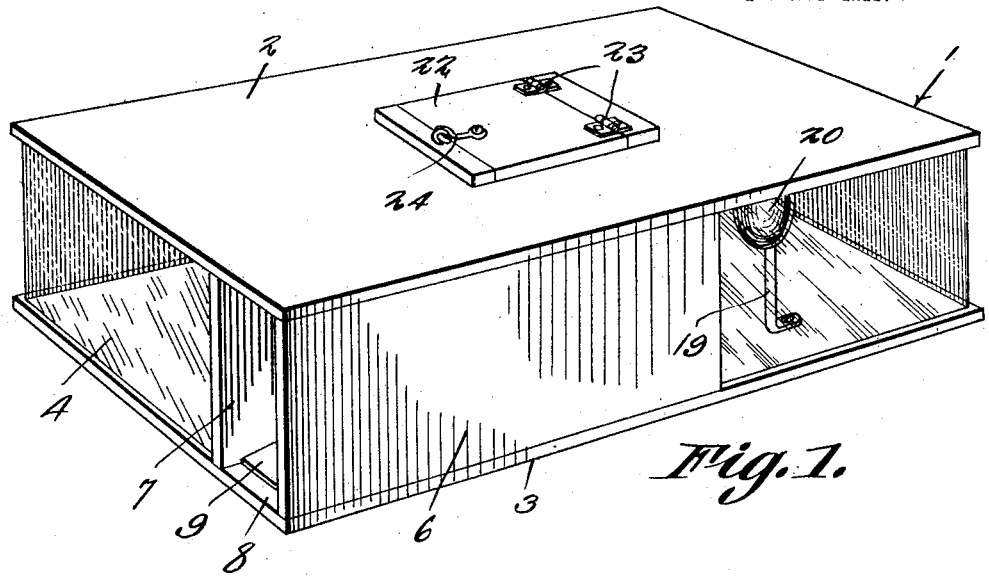
Figure 2:
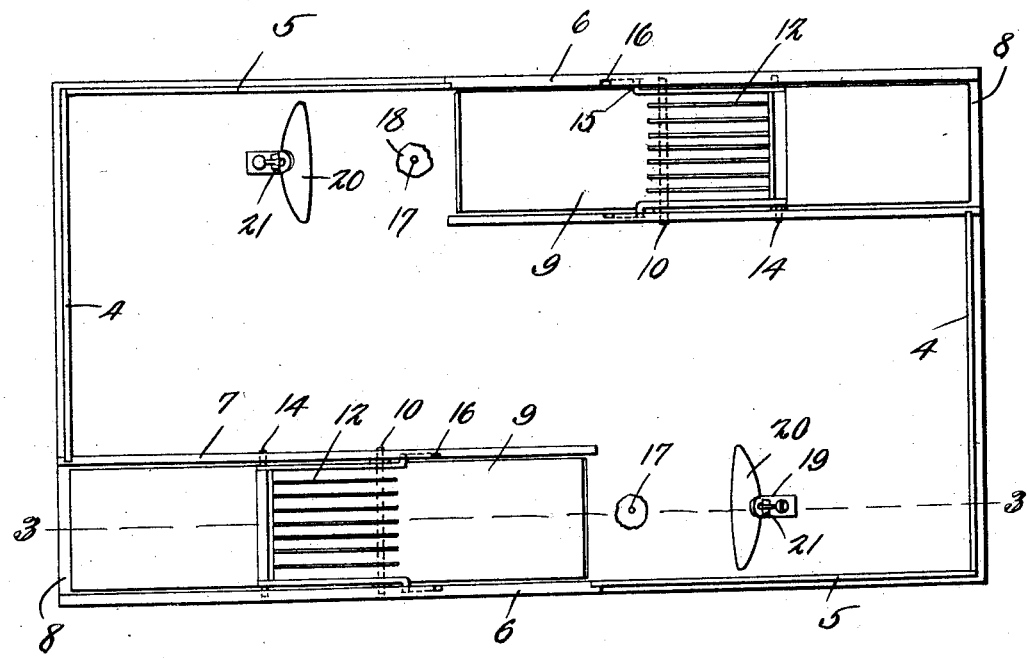

Figure 1 shows in perspective, a trap constructed in accordance with the invention; Figure 2 is a top plan of the trap, the upper member thereof being removed; Figure 3 is a longitudinal section of the trap, taken on the line 3—3 of Figure 2; Figure 4 is a section on the line 4—4 of Figure 3; Figure 5 is a fragmental section taken approximately on the line 5—5 of Figure 3.

In carrying out the invention there is provided a box-like casing 1 including a top 2, a bottom 3, ends 4, side sections 5, and side panels 6. The side panels 6 are opaque and are disposed diagonally opposite to each other, the ends 4 and the side sections 5 preferably being made of glass. Partitions 7 extend parallel to the side panels 6 and define longitudinal run ways 8 in the trap.

Tiltable platforms 9 are located in the run ways 8 and are supported, intermediate their ends, on pivot elements 10. Seats 11 are formed in the partitions 7 and in the side panels 6, for the reception of the pivot elements 10, to the end that the pivot elements, and, consequently, the platforms 9 may be adjusted. The platforms 9 are so mounted on the pivot elements 10 that the outer ends of the platforms rest on the bottom 3. Gates 12 are disposed in the run ways 8, above the tiltable platforms 9. The gates 12 are disposed at an acute angle to the platforms 9, the construction being such that, should an animal in the trap pull down the inner end of the platform 9, it will be impossible for the animal to retreat past the gate 12. When, however, the animal is entering the trap along the tiltable platform 9, the gate 12 will swing upwardly, and permit the animal to pass. At its upper end, each gate 12 is supplied with trunnions 14, journaled in the side panels 6 and in the partitions 7. The gates 12 may be made of rods, the outermost rods having laterally extended fingers 15 mounted to move in arcuate slots 16 formed in the side panels 6 and in the partitions 7. When the fingers 15 arrive at the lower ends of the arcuate slots 16, the gate 12 is prevented from swinging downwardly, in contact with the corresponding platform 9. Consequently, the gate 12 does not interfere with the tilting or swinging movement of the platform 9 on its pivot 10.

Upstanding bait supports 17 are mounted on the bottom 3 in front of the tiltable platforms 9. The bait supports 17 are of such a height that when the bait 18 is mounted on the support 17, the bait will be below the inner end of the tiltable platform 9, and will be hidden by the platform. Standards 19 are erected on the bottom 3 to the rear of the bait supports 17. Magnifying reflectors 20 are provided, the magnifying reflectors being adjustably secured, as indicated at 21, to the standards 19.

The top 2 of the casing 1 may be provided with a door 22, hinged as indicated at 23, and held closed by any suitable means, indicated at 24. The trapped animals may be removed from the casing 1, when the door 22 is opened.

In practical operation, the animal, entering the run way 8, does not see the bait 18 but does see the highly magnified image of the bait, in the reflector 20. Consequently the animal is more readily attracted than would be the case if the bait 18 itself, were visible. Since the reflector 20 is adjustably secured as indicated at 21 to the standard 19, the reflector may be so placed that the image of the bait 18 may be reflected back into the run way 8.

The animal advancing along the platform 9 raises the gate 12 and, ultimately, arrives at a point adjacent to the inner end of the platform 9 whereupon the platform tilts and the animal enters the interior of the casing 1. A retreat of the animal is impossible, owing to the way in which the gate cooperates with the tiltable platform 9.

Having thus described the invention, what is claimed is:—

1. In a device of the class described, a casing; a tiltable platform located in the casing; a magnifying reflector located in the casing; and a bait support located in the casing, between the inner end of the platform and the reflector, the bait support being so constructed that the bait thereon will be hidden by the inner end of the platform.

2. In a device of the class described, a casing; a tiltable platform in the casing; a reflector located in the casing; a bait support located in the casing, between the inner end of the platform and the reflector, the bait support being so constructed that the bait thereon will be hidden by the platform; and means for adjusting the reflector, thereby to render the bait visible to an animal on the platform.

In testimony that I claim the foregoing as my own, I have hereto affixed my signature in the presence of two witnesses.

JOSEPH W. HIETT.

Witnesses:
J. W. RHEA,
G. W. McCLAIN.